(12) United States Patent
Rose et al.

(10) Patent No.: US 8,689,682 B2
(45) Date of Patent: Apr. 8, 2014

(54) DEVICE FOR SEPARATING MATERIALS OF VARYING FLOWABILITY THAT ARE MIXED TOGETHER

(75) Inventors: Wolfgang Rose, Stockeldorf/Eckhorst (DE); Theo-Martin Schaarschmidt, Lübeck (DE); Christian Denker, Klingberg/Scharbeutz (DE)

(73) Assignee: Nordischermaschinenbau Rud. Baader GmbH + Co. KG (DE)

( * ) Notice: Subject to any disclaimer, the term of this patent is extended or adjusted under 35 U.S.C. 154(b) by 0 days.

(21) Appl. No.: 13/522,479

(22) PCT Filed: Jan. 19, 2011

(86) PCT No.: PCT/EP2011/050652
§ 371 (c)(1),
(2), (4) Date: Jul. 16, 2012

(87) PCT Pub. No.: WO2011/092087
PCT Pub. Date: Aug. 4, 2011

(65) Prior Publication Data
US 2012/0285339 A1    Nov. 15, 2012

(30) Foreign Application Priority Data

Jan. 30, 2010  (DE) .................. 20 2010 001 849 U

(51) Int. Cl.
*A22C 17/04*   (2006.01)
(52) U.S. Cl.
USPC ................. 99/495; 99/457; 99/464; 210/784; 210/402; 100/153; 100/121
(58) Field of Classification Search
USPC .................. 99/495, 457, 460, 464, 466, 349; 452/138, 198; 100/153, 121, 156; 210/400, 783; 241/24.16, 236, 241, 241/293, 79
See application file for complete search history.

(56) References Cited

U.S. PATENT DOCUMENTS

| | | | |
|---|---|---|---|
| 3,396,768 A | | 8/1968 | Kurihara |
| 3,829,931 A | | 8/1974 | Suerbaum |
| 4,899,890 A | * | 2/1990 | Ewing et al. .................. 209/699 |
| 5,241,901 A | | 9/1993 | Kunig |
| 5,507,689 A | * | 4/1996 | McFarland et al. ........... 452/138 |

(Continued)

FOREIGN PATENT DOCUMENTS

| DE | 7216313 U | 7/1973 |
|---|---|---|
| DE | 69605965 T2 | 8/2000 |

(Continued)

OTHER PUBLICATIONS

International Search Report dated May 26, 2011 from International Patent Application No. PCT/EP2011/050652 filed Jan. 19, 2011 (2 pages).

(Continued)

Primary Examiner — Reginald L Alexander
(74) Attorney, Agent, or Firm — Schmeiser, Olsen & Watts

(57) ABSTRACT

The invention relates to an apparatus for separating materials of different flowability that are mixed together, comprising a housing having side walls, a hollow drum driven rotationally and mounted on the side walls and having a perforated peripheral surface M, an endless compression belt that can be pressed against the peripheral surface M from the outside, wrapping around a portion of the circumference of the hollow drum, a product intake wedge for feeding a product flow, a supporting apparatus for the compression belt having at least one support element disposed on the side of the compression belt opposite the hollow drum, and a stripping means for stripping off the compressed material from the hollow drum, which is distinguished in that the stripping means is disposed in the area of the product intake wedge.

8 Claims, 2 Drawing Sheets

(56) References Cited

U.S. PATENT DOCUMENTS

Figure 1:
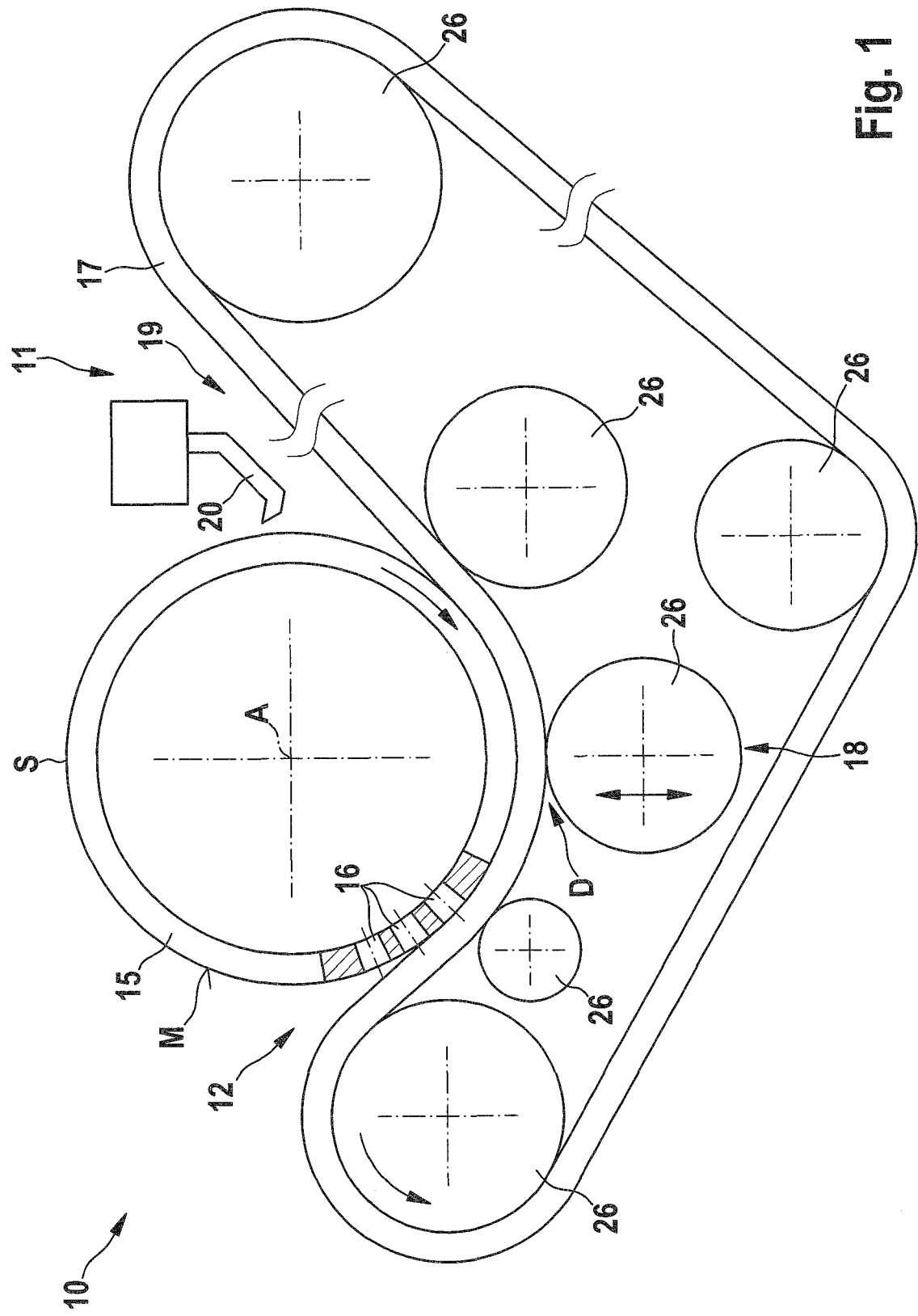

| | | | |
|---|---|---|---|
| 5,674,117 A * | 10/1997 | Kunig et al. | 452/138 |
| 5,873,775 A * | 2/1999 | Landahl et al. | 452/138 |
| 5,894,791 A * | 4/1999 | Rose et al. | 100/121 |
| 8,187,425 B2 * | 5/2012 | Bylander et al. | 162/232 |

FOREIGN PATENT DOCUMENTS

| | | |
|---|---|---|
| DE | 102007063465 A1 | 6/2009 |
| EP | 0262392 A2 | 4/1988 |
| EP | 0375877 A2 | 7/1990 |
| EP | 0642738 B1 | 4/1999 |
| FR | 2852266 A1 | 9/2004 |

OTHER PUBLICATIONS

German Search Report dated Oct. 20, 2010 from German Patent Application No. 20 2010 001849.8 filed Jan. 30, 2010 (7 pages).

Japanese Office Action; Patent Application No. 2012-539368, PTO's Mailing Date: Dec. 10, 2013, 4 pgs.

* cited by examiner

DEVICE FOR SEPARATING MATERIALS OF VARYING FLOWABILITY THAT ARE MIXED TOGETHER

DESCRIPTION

The invention relates to an apparatus for separating materials of different flowability that are mixed together, comprising a housing having side walls, a hollow drum driven rotationally and mounted on the side walls and having a perforated peripheral surface, an endless compression belt that can be pressed against the peripheral surface from the outside, wrapping around a portion of the circumference of the hollow drum, a product intake wedge for feeding a product flow, a supporting apparatus for the compression belt having at least one support element disposed on the side of the compression belt opposite the hollow drum, and a stripping means for stripping off the compressed material from the hollow drum.

Such apparatuses are used in various areas of industry, but in particular in the food industry. With the apparatuses described above, which are also referred to as separating devices or separators, various kinds of materials can be subjected to a separating process. For this purpose the materials to be separated, that is, the material to be compressed or separated, are pressed against the perforated peripheral surface of the hollow drum from the outside by means of the endless compression belt. Under this pressure, the more readily flowing components of the compressed material are pressed through the perforations in the peripheral surface into the inner cavity of the rotating hollow drum, while the less readily flowing components of the compressed material remain outside on the peripheral surface of the hollow drum.

Materials or products which differ or of which the composition differs in their diverging flow behaviour are accessible to such separation. The possibility and/or need for the separation of materials of varying flowability that are mixed together lies e.g. in the processing of animal bodies (for example, separation of the meat from the skin, sinews, rind, bones etc.) or parts thereof, in the processing of fruit and vegetables (for example, separation of the flesh of the fruit from peel, stems, core or stones, etc.), in the reconditioning of wrongly packaged foodstuffs (for example, the separation of butter or cheese from the packing material) or the like. Concrete examples of application are e.g. the removal of stones from dates or the unpacking of cheese slices packaged in film.

In the removal of stones or unpacking or any other corresponding separation, a product flow starting from a product input region is conveyed between the compression belt and the hollow drum through to a product output region. In the process, the materials of varying flowability are separated by the fact that the more readily flowing materials, viz. the fruit flesh in the example of removing stones from dates, are at least partially pressed into the hollow drum and from there carried away. The less readily flowing materials, viz. the stones in the example of removing stones from dates, are collected in the product output region behind the hollow drum in the direction of transport T of the product flow and carried away. However, the residual flow of the product flow which is not pressed through the perforated peripheral surface into the interior of the hollow drum, including the less readily flowing components, usually adheres at least partially to the outside of the peripheral surface of the hollow drum.

In the state of the art it is usual for stripping means to be provided, by means of which the less readily flowing components of the compressed material, which remain on the outside of the peripheral surface of the hollow drum, namely the residual flow, are stripped off. Such an apparatus with corresponding stripping means can be found e.g. in EP 0 642 738 B1. In this is described a device in which, in an upper region of the periphery on the side of the product output region, is located a stripping apparatus which is operatively connected to the outer peripheral surface of the hollow drum. This stripping apparatus is designed and disposed in such a way that the less readily flowing components of the product flow which lie on or adhere to the outside of the peripheral surface are automatically stripped off with each rotation of the hollow drum and fall into the product output region, from where they are carried away.

From DE 10 2007 063 465 A1 is known an apparatus in which the stripping means is admittedly positioned in the same location as with the apparatus mentioned above, namely above the product output region. However, the stripping means is controlled in this apparatus. This means that the product flow or residual flow which lies on or adheres to the outside of the hollow drum can, depending on requirements, perform several rotations with the hollow drum in order to pass repeatedly through the pressing zone formed between the compression belt and the hollow drum before it is stripped off the hollow drum by the stripping means, because the stripping means is movable back and forth between a standby position a long distance away from the hollow drum and a working position in which the stripping means is operatively connected to the hollow drum. But at the end of the separation process, the less readily flowing components of the product stream which lie on or adhere to the outside of the peripheral surface are in turn automatically stripped off and fall into the product output region, from where they are carried away.

These known designs of the apparatus have, however, proved to be disadvantageous particularly in connection with the removal of stones from fruit, for example the removal of stones from dates. By the repeated rotation of the product flow or residual flow which lies on or adheres to the outside of the peripheral surface, in the example of the removal of stones from dates the stones are exposed. If the residual flow remains with the stones on the outside of the hollow drum, the stones are pressed repeatedly in the region of the pressing zone. In particular due to the differential speed between the compression belt and the hollow drum—usually the speed of rotation of the hollow drum is much greater than the speed of conveying of the compression belt—the stones are rubbed at their surface when they pass through the pressing zone. This firstly has the drawback that the fruit flesh which is pressed into the interior of the hollow drum is contaminated with the material rubbed off the stones. Secondly, the yield in the recovery of fruit flesh is lower, as the residual flow adhering to the peripheral surface is always subjected to pressure at the same location in the pressing zone, so that remains of fruit flesh are always to be found on the stones. In addition to the loss of yield, this effect also leads to the residual flow with the stones being capable of being carried away only with difficulty. The known solutions further have the drawback that the machine parts, in particular the hollow drum and the compression belt, wear quickly.

It is therefore the object of the invention to provide a simple and compact apparatus which ensures more gentle and effective separation of mixed materials of different flowability for the product and/or the apparatus, particularly in the removal of stones from dates.

This object is achieved by an apparatus of the kind mentioned hereinbefore by the fact that the stripping means is disposed in the area of the product intake wedge. With this surprisingly simple solution, namely positioning of the stripping means on the opposite side of the hollow drum in relation to the direction of transport T of the product flow, firstly the result is that the residual flow lying on or adhering to the hollow drum can be detached and loosened and fed back to the product intake wedge. The residual flow which is stripped off the hollow drum can in this case be mixed with the newly added product flow. Due to loosening and mixing, the material rubbed off the stones is reduced. Secondly, the design according to the invention leads to the fruit pulp being detached from the stone better and more extensively so that, after removal from the product or residual flow, the stones leave the separating process independently, as it were, and fly into the product output region.

Appropriately, the stripping means which is disposed in the product input region has a single blade. The blade ensures easy and safe cleaning of the peripheral surface of the hollow drum, so that the whole of the residual flow adhering to the hollow drum falls into the product intake wedge.

A preferred development of the invention is distinguished in that the stripping means is disposed at a distance from the hollow drum, wherein the stripping means is provided with an adjusting mechanism for adjusting the distance from the hollow drum. With the possibility of varying the distance between the stripping means and the hollow drum, products or product flows of different contents can be processed better.

Advantageously, associated with each side wall of the apparatus on the inner side facing towards the compression belt are elements for feeding food-grade oil. During the separating process, sugar crystals form, adhering to the side walls of the apparatus. This produces a very rough surface on the inner surfaces of the side walls, as a result of which the compression belt which is guided along the side walls is destroyed in the region of its edges. Due to the food-grade oil, firstly the deposition of sugar on the side walls is prevented, and secondly the friction between the compression belt and the side walls is reduced. The service life of the compression belt is therefore lengthened substantially.

A preferred embodiment of the invention is characterised in that in the region of the product intake wedge are disposed insertion aids for controlled feeding of the product flow into the product intake wedge. As a result, stones located in the product flow are in particular prevented from destroying the edges of the compression belt. The insertion aids cause both the newly fed product flow and the residual flow which is detached from the hollow drum to be guided centrally and at a distance from the edges of the compression belt in the product intake wedge.

An appropriate embodiment of the invention provides that the supporting apparatus device is designed so that it can be lowered with the or each support element. As a result, the compression belt can yield to the stones in the region of the pressing zone, so that the material rubbed off the stones is reduced.

The advantages described in connection with the features according to the invention, by the example of the removal of stones from dates, naturally apply in the same way to other products or mixtures of materials to be separated.

Figure 2:
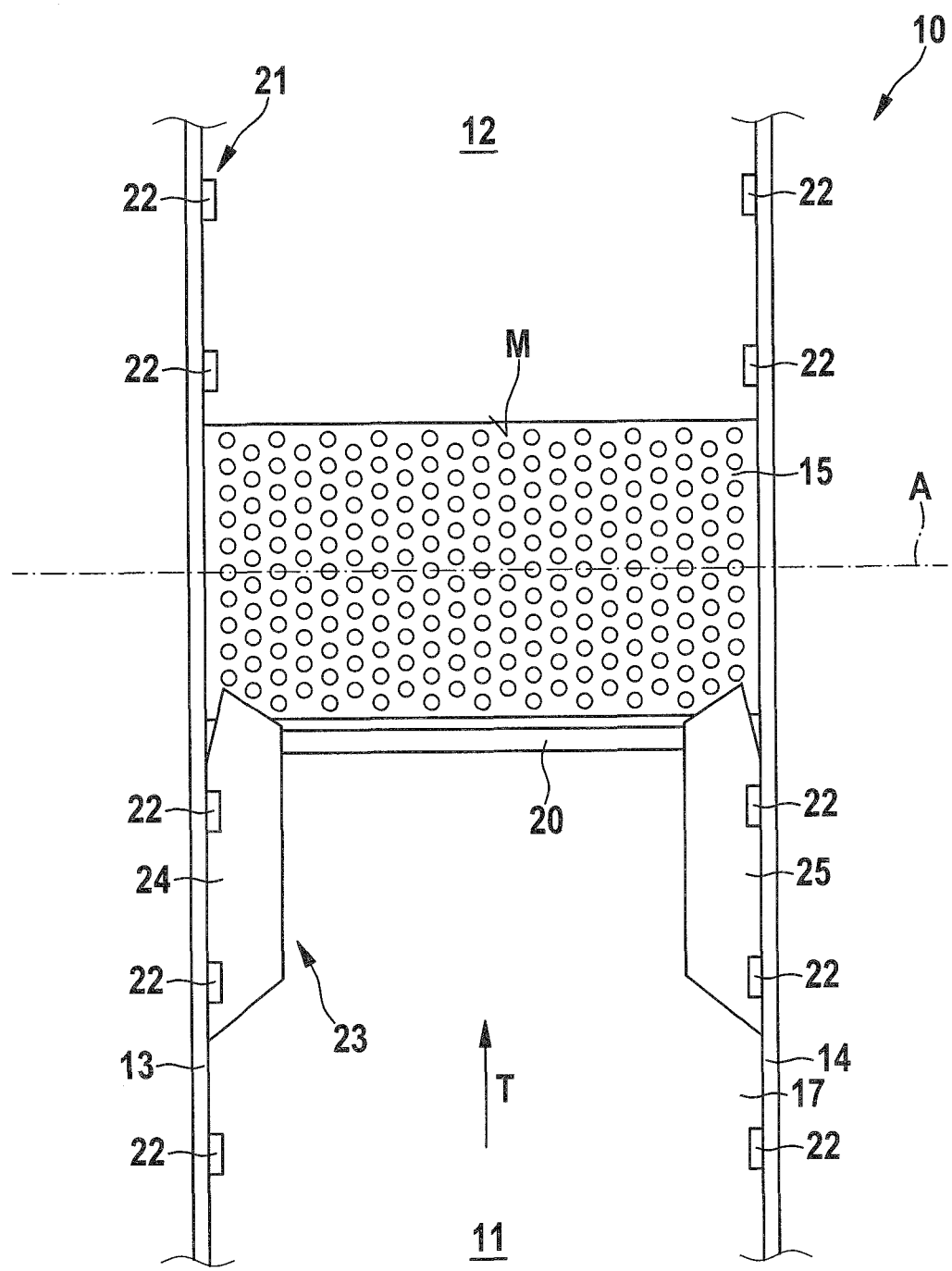

Further appropriate and/or advantageous features and developments are apparent from the subsidiary claims and the description. A particularly preferred embodiment is described in more detail with the aid of the attached drawings. The drawings show:

FIG. 1 a schematic side view of the apparatus according to the invention,

FIG. 2 a schematic top view of the apparatus according to FIG. 1.

The apparatus described in the embodiment shown serves to remove stones from dates. But naturally the apparatus according to the invention is also constructed and designed to separate any mixed materials of different flowability, that is, in particular meat, fish and other types of fruit and vegetables.

In FIG. 1 is shown an apparatus 10 for separating materials of different flowability that are mixed together. A product flow composed of these mixed materials can be conveyed in the direction of transport T from a product input region 11 into a product output region 12. The apparatus 10 comprises a housing, not shown explicitly, having side walls 13, 14 (shown only partially in FIG. 2). Between these side walls 13, 14 is mounted a hollow drum 15 which is or can be driven rotationally by drive means, not described explicitly. The axis of rotation A of the hollow drum 15 runs transversely to the direction of transport T of the product flow. The hollow drum 15 itself has a perforated peripheral surface M. To put it another way, in the peripheral surface M are formed openings 16 which allow the passage of parts of the product flow, in particular the more readily flowing, soft and crushable parts, into the interior of the hollow drum 15.

Furthermore, the apparatus 10 comprises a compression belt 17. The hollow drum 15 is wrapped on the outside over part of its circumference by the preferably endless compression belt 17. The compression belt 17 is preferably made of a resilient material such as e.g. rubber, polyurethane or the like. The compression belt 17 can also be made from other materials in other embodiments and also be a press chain or the like. For the purpose of avoiding so-called product pouches in the region of wrapping, a supporting apparatus 18 is disposed on the side of the compression belt 17 opposite the hollow drum 15 for supporting the compression belt 17. The supporting apparatus 18 can comprise rollers and/or a supporting belt and/or a supporting chain or the like. In the region of wrap, between the hollow drum 15 and the compression belt 17 is formed the pressing zone D.

Due to the arrangement of hollow drum 15 and compression belt 17, in the product input region 11 is formed a product intake wedge 19. This product intake wedge 19 preferably extends across the whole width of the compression belt 17, but may extend over only part of the width. In the region of the product intake wedge 19 is disposed a stripping means 20 for stripping off the product flow or residual flow lying on or adhering to the hollow drum 15. The stripping means 20, which is preferably a single blade, is disposed above the compression belt 17, this being at a distance from the compression belt 17 which ensures unhindered feeding of the product flow into the product intake wedge 19. In further embodiments, not shown, the stripping means 20 can also be composed of several individual blades or as a scraper or the like. Preferably the stripping means 20 is also disposed above the axis of rotation A of the hollow drum 15. To be more precise, the region of operative connection between the stripping means 20 and the hollow drum 15 is above the axis of rotation A. In relation to the position of the stripping means 20 along the circumference of the hollow drum 15, it must be ensured that the stripping means 20 starting from the upper crown S of the hollow drum 15 is disposed in the direction of the product intake wedge 19 (clockwise in FIG. 1), so that the residual flow which is removed from the hollow drum 15 by the stripping means 19 inevitably falls back into the product intake wedge 19. But other positions or arrangements of the stripping means 20 between the crown S and the compression belt 17 are possible too.

The stripping means 20 is preferably disposed at a distance from the hollow drum 15 for contactless stripping/cleaning of the hollow drum 15. The stripping means 20 can also be provided with an adjusting mechanism for adjusting the distance between the stripping means 20 and the hollow drum 15. In a development of this option, the stripping means 20 can also be actively controllable to vary the distance during the separation process.

In addition to the stripping means 20 in the region of the product intake wedge 19, purely as an option there may be provided a further stripping means, not shown explicitly, which is disposed in a conventional manner in the product output region 12. In relation to the direction of transport T of the product flow, this additional stripping means is disposed behind the hollow drum 15 and from the crown S (anticlockwise in FIG. 1) in the direction of the product output region 12. The additional stripping means can likewise be disposed at a distance from the hollow drum 15, wherein the stripping means can also be equipped with an adjusting mechanism for adjusting the distance from the hollow drum 15. The adjusting mechanisms of the two stripping means can also be synchronised with each other and/or controllable individually in coordination with each other via one or more control means.

In a further embodiment of the apparatus 10 according to the invention, associated with the apparatus can be a means 21 for feeding a medium which reduces the friction between the compression belt 17 and the side walls 13, 14 of the apparatus 10. This means 21 can be disposed centrally. In the embodiment shown, the means 21 comprises several elements, preferably nozzles 22, by means of which the medium, preferably an oil suitable for foodstuffs, can be applied to the inner sides of the side walls 13, 14. The nozzles 22 are disposed on the inner sides of the side walls 13, 14, distributed over the whole length of the compression belt 17. Preferably the nozzles 22 are disposed in the upper region of the side walls 13, 14, so that the oil can flow automatically into the region of contact between the outer edges of the compression belt 17 and the side walls 13, 14. But other designs and arrangements of the means 21 are possible too.

Preferably, in the region of the product intake wedge 19 are disposed insertion aids 23 for controlled feeding of the product flow into the product intake wedge 19. The insertion aids 23, which can be disposed on one or both sides, serve to guide not only the newly fed product flow, but also the residual flow which is removed/detached from the hollow drum 15 and which then again becomes part of the product flow, this being in particular away from the edge regions of the compression belt 17. In the embodiment shown, the insertion aids 23 are formed by side portions 24, 25. These side portions 24, 25 are provided with mould inclines for centring the product flow—in relation to the transverse direction of the compression belt 17—towards the centre of the compression belt 17. The insertion aids 23 can in other embodiments be baffles, flaps or the like. The insertion aids 23 are preferably dismountable, but can be an integral part of the side walls 13, 14. In the direction of the hollow drum 15, the insertion aids 23 can also be provided with a scraping edge or the like, to assist the stripping means 20 which can be disposed between the insertion aids 23 or behind the insertion aids 23 in the direction of transport T of the product flow.

The supporting apparatus 18 is in particular designed so that it can be lowered in the region of the pressing zone D. For this purpose the supporting apparatus 18 preferably has several support elements 26. The support elements 26 are preferably guide and/or drive rollers. Individual support elements 26 or all of them are guided e.g. in slots and spring-mounted for lowering. But the capacity of the support elements 26 for being lowered can also be achieved by pneumatic and/or hydraulic components or in some other known manner. In further embodiments, not shown explicitly, associated with the hollow drum 15 preferably in the region of the product intake wedge 19 and/or the stripping means 20 can be routing elements. By means of the routing elements, the residual flow which is removed/detached from the hollow drum 15 can be fed in a targeted manner e.g. to the edge regions or the centre of the compression belt, in relation to the width of the compression belt. The routing elements can be ordinary plates or the like or helically wound guide bodies.

The invention claimed is:

1. Apparatus for separating materials of different flowability that are mixed together, comprising a housing having side walls, a hollow drum driven rotationally and mounted on the side walls and having a perforated peripheral surface M, an endless compression belt that can be pressed against the peripheral surface M from the outside, wrapping around a portion of the circumference of the hollow drum, a product intake wedge for feeding a product flow, wherein product contacts the surface M as product travels in a transport direction and wherein the product intake wedge is located in a direction opposite the transport direction from the drum, a supporting apparatus for the compression belt having at least one support element disposed on the side of the compression belt opposite the hollow drum, and a stripping means for stripping off the pressed material from the hollow drum, characterised in that the stripping means is disposed in the area of the product intake wedge.

2. Apparatus according to claim 1, characterised in that the stripping means which is disposed in the product input region is a single blade.

3. Apparatus according to claim 1, characterised in that in the region of the product intake wedge are disposed insertion aids for controlled feeding of the product flow into the product intake wedge.

4. Apparatus according to claim 1, characterised in that in the region of the product intake wedge are disposed two side portions which are provided with mould inclines for centring the product flow towards the centre of the compression belt.

5. Apparatus according to claim 1, characterised in that the supporting apparatus is designed so that it can be lowered with each support element.

6. Apparatus according to claim 1, characterised in that each support element is spring-mounted.

7. Apparatus for separating materials of different flowability that are mixed together, comprising a housing having side walls, a hollow drum driven rotationally and mounted on the side walls and having a perforated peripheral surface M, an endless compression belt that can be pressed against the peripheral surface M from the outside, wrapping around a portion of the circumference of the hollow drum, a product intake wedge for feeding a product flow, a supporting apparatus for the compression belt having at least one support element disposed on the side of the compression belt opposite the hollow drum, and a stripping means for stripping off the pressed material from the hollow drum, characterised in that the stripping means is disposed in the area of the product intake wedge, further characterised in that the apparatus has a means for feeding a medium which reduces the friction between the compression belt and the side walls of the apparatus.

8. Apparatus for separating materials of different flowability that are mixed together, comprising a housing having side walls, a hollow drum driven rotationally and mounted on the side walls and having a perforated peripheral surface M, an endless compression belt that can be pressed against the peripheral surface M from the outside, wrapping around a portion of the circumference of the hollow drum, a product intake wedge for feeding a product flow, a supporting apparatus for the compression belt having at least one support element disposed on the side of the compression belt opposite the hollow drum, and a stripping means for stripping off the pressed material from the hollow drum, characterised in that the stripping means is disposed in the area of the product intake wedge, further characterised in that associated with each side wall of the apparatus on the inner side facing towards the compression belt are elements for feeding food-grade oil.

* * * * *

UNITED STATES PATENT AND TRADEMARK OFFICE
CERTIFICATE OF CORRECTION

PATENT NO.         : 8,689,682 B2
APPLICATION NO.    : 13/522479
DATED              : April 8, 2014
INVENTOR(S)        : Wolfgang Rose, Theo-Martin Schaarschmidt and Christian Denker It is certified that error appears in the above-identified patent and that said Letters Patent is hereby corrected as shown below:

TITLE PAGE

In Assignee (73), delete "Nordischermaschinenbau rud. Baader GmbH + Co. KG" and insert
-- Nordischer Maschinenbau Rud. Baader GmbH + Co. KG --

Signed and Sealed this
Fifteenth Day of July, 2014

Michelle K. Lee
*Deputy Director of the United States Patent and Trademark Office*